US008337290B2

(12) United States Patent
Nguyen et al.

(10) Patent No.: US 8,337,290 B2
(45) Date of Patent: Dec. 25, 2012

(54) METHOD OF GAMING, A GAME CONTROLLER AND A GAMING SYSTEM A GENERATION RULE SPECIFYING WHEN A NEW SYMBOL PATTERN IS SELECTED

(75) Inventors: Hung Ngoc Nguyen, Sefton (AU); Lynne Cheryl Oldfield, Stanmore (AU)

(73) Assignee: Aristocrat Technologies Australia Pty, Ltd. (AU)

( * ) Notice: Subject to any disclaimer, the term of this patent is extended or adjusted under 35 U.S.C. 154(b) by 685 days.

(21) Appl. No.: 12/331,061

(22) Filed: Dec. 9, 2008

(65) Prior Publication Data

US 2009/0191939 A1 Jul. 30, 2009

(30) Foreign Application Priority Data

Dec. 18, 2007 (AU) ................................ 2007906934
Feb. 20, 2008 (AU) ................................ 2008900804

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2006.01) |

(52) U.S. Cl. ................................ 463/19; 463/20; 463/22

(58) Field of Classification Search .................... 463/19, 463/20, 22
See application file for complete search history.

(56) References Cited

U.S. PATENT DOCUMENTS

| | | | | |
|---|---|---|---|---|
| 6,645,071 | B2 | 11/2003 | Perrie et al. | |
| 7,192,347 | B1 | 3/2007 | Marks et al. | |
| 2004/0092299 | A1 | 5/2004 | Gauselmann | |
| 2004/0259628 | A1 | 12/2004 | Randall | |
| 2007/0060254 | A1* | 3/2007 | Muir | 463/16 |
| 2007/0060287 | A1 | 3/2007 | Reddicks et al. | |
| 2007/0275778 | A1 | 11/2007 | Fong et al. | |
| 2009/0075714 | A1* | 3/2009 | Meyer et al. | 463/19 |

FOREIGN PATENT DOCUMENTS

| | | |
|---|---|---|
| CA | 2528267 | 5/2007 |
| JP | 2007021226 | 2/2007 |
| JP | 2007021227 | 2/2007 |
| JP | 2007061423 | 3/2007 |
| JP | 2007090053 | 4/2007 |
| JP | 2007090081 | 4/2007 |
| JP | 2007090082 | 4/2007 |
| JP | 2007105125 | 4/2007 |
| JP | 2007117750 | 5/2007 |

* cited by examiner

*Primary Examiner* — William M. Brewster
(74) *Attorney, Agent, or Firm* — McAndrews, Held & Malloy, Ltd.

(57) ABSTRACT

A method of gaming comprising: generating a game outcome by selecting symbols for a plurality of symbol positions arranged in a plurality of columns, at least some of the selected symbols being displayed to a player; generating a win entitlement by selecting a symbol pattern to be evaluated in respect of the game outcome, the symbol pattern consisting of a subset of displayed symbol positions; and evaluating the win entitlement by determining the extent to which the subset of displayed symbol positions corresponds to one or more designated winning symbols.

54 Claims, 9 Drawing Sheets

METHOD OF GAMING, A GAME CONTROLLER AND A GAMING SYSTEM A GENERATION RULE SPECIFYING WHEN A NEW SYMBOL PATTERN IS SELECTED

RELATED APPLICATIONS

This application claims priority to Australian Provisional Patent Application No. 2007906934, having a filing date of Dec. 18, 2007 and Australian Provisional Patent Application No. 2008900804 filed Feb. 20, 2008, which are hereby incorporated by reference herein in their entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

The present invention relates to a method of gaming, a game controller and a gaming system.

BACKGROUND OF THE INVENTION

Early gaming machines had their outcome determined by the symbols that stopped on a single "pay" or "win" line after the reels were spun. More recently gaming machines have been adapted to have larger number of pay lines, for example 25 lines, each line being a unique set (one from each reel) of symbol positions at which symbols are displayed on the display of the gaming machine; the symbol positions being contiguous so that they form a line across the reels. The player selects how many of the win lines they will play, the reels are spun, and the gaming machine determines whether the symbol combinations on the lines the player has selected are winning combinations.

While such gaming systems provide users with enjoyment, a need exists for alternative gaming systems in order to maintain or increase player enjoyment, and in particular which allow winning outcomes to be achieved in different ways.

BRIEF SUMMARY OF THE INVENTION

In a first aspect, the invention provides a method of gaming comprising:

generating a game outcome by selecting symbols for a plurality of symbol positions arranged in a plurality of columns, at least some of the selected symbols being displayed to a player;

generating a win entitlement by selecting a symbol pattern to be evaluated in respect of the game outcome, the symbol pattern consisting of a subset of displayed symbol positions; and evaluating the win entitlement by determining the extent to which the subset of displayed symbol positions corresponds to one or more designated winning symbols.

In an embodiment, the method comprises evaluating the game outcome in respect of a base win entitlement defined by one or more combinations of symbol positions, each combination formed from a symbol position of each column.

In an embodiment, the number of symbol positions of the subset is randomly determined.

In an embodiment, the positions of the symbol positions of the subset are randomly determined.

In an embodiment, at least one random determination is limited by one or more constraints.

In an embodiment, a constraint is a maximum number of symbol positions.

In an embodiment, a constraint is a minimum number of symbol positions.

In an embodiment, a constraint is that the symbol positions must be contiguous.

In an embodiment, a new win entitlement is generated for each game round such that a new symbol pattern is selected for each game round.

In an embodiment, a new win entitlement is generated after a defined period such that a new symbol pattern is selected for each new player.

In an embodiment, a new win entitlement is generated subsequent to a winning outcome occurring.

In an embodiment, determining the extent to which the subset of displayed symbol positions corresponds to one or more designated winning symbols includes determining whether the number of winning symbols in the symbol pattern is within a designated number of symbols required to fill all the symbol positions.

In an embodiment, determining the extent to which the subset of displayed symbol positions corresponds to one or more designated winning symbols includes determining whether there are any left over winning symbols when the symbol pattern is completed.

In an embodiment, the base win entitlement is defined by a player selection of one or more play lines, each play line consisting of a combination of displayed symbol positions.

In an embodiment, the base win entitlement is defined by a player selection of reels, each symbol position of a selected reel forming a symbol combination with designated displayed symbol positions of non-selected reels.

In an embodiment, the step of selecting a symbol pattern is performed by a player.

In an embodiment, the step of selecting a symbol pattern is performed by a game controller.

In a second aspect, the invention provides a game controller for a gaming system, the game controller arranged to:

generate a game outcome by selecting symbols for a plurality of symbol positions arranged in a plurality of columns, at least some of the selected symbols being for display to a player on a display; and evaluate a win entitlement generated by obtaining a symbol pattern to be evaluated in respect of the game outcome, the symbol pattern consisting of a subset of displayed symbol positions, the evaluation performed by determining the extent to which the subset of displayed symbol positions corresponds to one or more designated winning symbols.

In an embodiment, the game controller comprises an outcome generator arranged to generate the game outcome.

In an embodiment, the game controller comprises a symbol pattern generator arranged to generate the symbol pattern.

In an embodiment, the game controller is arranged to determine the symbol pattern based on one or more selections made by a player employing a game play mechanism in data communication with the game controller.

In an embodiment, the game controller is arranged to evaluate the game outcome in respect of a base win entitlement defined by one or more combinations of symbol positions, each combination formed from a symbol position of each column.

In an embodiment, the game controller is arranged to randomly determine the number of symbol positions of the subset.

In an embodiment, the game controller is arranged to randomly determine the positions of the symbol positions of the subset.

In an embodiment, at least one random determination is limited by one or more constraints.

In an embodiment, a constraint is a maximum number of symbol positions.

In an embodiment, a constraint is a minimum number of symbol positions.

In an embodiment, a constraint is that the symbol positions must be contiguous.

In an embodiment, the game controller is arranged to generate a new win entitlement for each game round such that a new symbol pattern is selected for each game round.

In an embodiment, the game controller is arranged to generate a new win entitlement after a defined period such that a new symbol pattern is selected for each new player.

In an embodiment, the game controller is arranged to generate a new win entitlement subsequent to a winning outcome occurring.

In an embodiment, the game controller is arranged to determine the extent to which the subset of displayed symbol positions corresponds to one or more designated winning symbols at least partly by determining whether the number of winning symbols in the symbol pattern is within a designated number of symbols required to fill all the symbol positions.

In an embodiment, the game controller is arranged to determine the extent to which the subset of displayed symbol positions corresponds to one or more designated winning symbols at least partly by determining whether there are any left over winning symbols when the symbol pattern is completed.

In an embodiment, the game controller is arranged to select the symbol pattern.

In an embodiment, the game controller comprises a memory storing program code and a processor arranged to implement the game controller by executing the program code.

In a third aspect, the invention provides a gaming system comprising:

a display; and a game controller arranged to:

generate a game outcome by selecting symbols for a plurality of symbol positions arranged in a plurality of columns, at least some of the selected symbols being for display to a player on a display; and evaluate a win entitlement generated by obtaining a symbol pattern to be evaluated in respect of the game outcome, the symbol pattern consisting of a subset of displayed symbol positions, the evaluation performed by determining the extent to which the subset of displayed symbol positions corresponds to one or more designated winning symbols.

In an embodiment, the game controller comprises an outcome generator arranged to generate the game outcome.

In an embodiment, the game controller comprises a symbol pattern generator arranged to generate the symbol pattern.

In an embodiment, the display is part of a player interface in data communication with the game controller, the player interface further comprising a game play mechanism operable by a player to place a wager from which a base win entitlement is established, the base win entitlement being defined by one or more combinations of symbol positions, each combination formed from a symbol position of each column.

In an embodiment, the game play mechanism is operable to select the symbol pattern.

In an embodiment, the game controller is arranged to randomly determine the number of symbol positions of the subset.

In an embodiment, the game controller is arranged to randomly determine the positions of the symbol positions of the subset.

In an embodiment, at least one random determination is limited by one or more constraints.

In an embodiment, at least one constraint is selected from the group comprising a maximum number of symbol positions; a minimum number of symbol positions; and a requirement that the symbol positions must be contiguous.

In an embodiment, the game controller is arranged to generate a new win entitlement for each game round such that a new symbol pattern is selected for each game round.

In an embodiment, the game controller is arranged to generate a new win entitlement after a defined period such that a new symbol pattern is selected for each new player.

In an embodiment, the game controller is arranged to generate a new win entitlement subsequent to a winning outcome occurring.

In an embodiment, the game controller is arranged to determine the extent to which the subset of displayed symbol positions corresponds to one or more designated winning symbols at least partly by determining whether the number of winning symbols in the symbol pattern is within a designated number of symbols required to fill all the symbol positions.

In an embodiment, the game controller is arranged to determine the extent to which the subset of displayed symbol positions corresponds to one or more designated winning symbols at least partly by determining whether there are any left over winning symbols when the symbol pattern is completed.

In an embodiment, the game controller is arranged to select the symbol pattern.

In an embodiment, the gaming system comprises a memory storing program code and a processor arranged to implement the game controller by executing the program code.

In a fourth aspect, the invention provides computer program code which when executed implements the above method.

In a fifth aspect, the invention provides a computer readable medium comprising the above program code.

In a sixth aspect, the invention provides a data signal comprising the above program code.

In a seventh aspect, the invention extends to transmitting the above program code.

BRIEF DESCRIPTION OF SEVERAL VIEWS OF THE DRAWINGS

An exemplary embodiment of the invention will now be described with reference to the accompanying drawings in which.

DETAILED DESCRIPTION OF THE INVENTION

Figure 1:
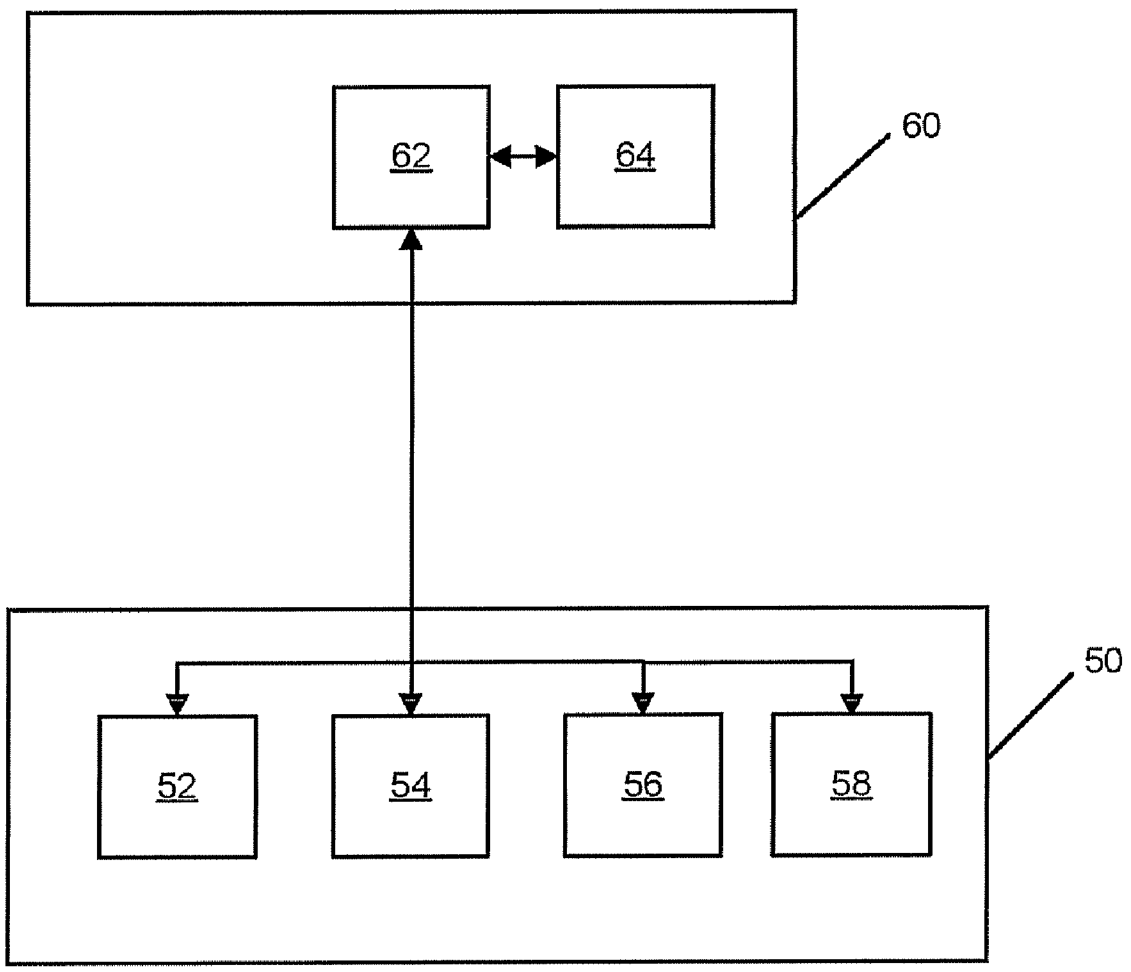
FIG. 1 is a block diagram of the core components of a gaming system.

Referring to the drawings, there is shown a gaming system having a game controller arranged to implement a game where a win entitlement is generated for the player by selecting a subset of the displayed symbol positions to form a symbol pattern and determining the extent to which the symbol pattern is completed by designated winning symbols. Typically, the win entitlement is generated as an additional win entitlement.

General Construction of Gaming System

The gaming system can take a number of different forms. In a first form, a stand alone gaming machine is provided wherein all or most components required for implementing the game are present in a player operable gaming machine.

In a second form, a distributed architecture is provided wherein some of the components required for implementing the game are present in a player operable gaming machine and some of the components required for implementing the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in stand alone gaming machine mode, "thick client" mode or "thin client" mode depending on the game being played, operating conditions, and so on. Other variations will be apparent to persons skilled in the art.

Irrespective of the form, the gaming system comprises several core components. At the broadest level, the core components are a player interface 50 and a game controller 60 as illustrated in FIG. 1. The player interface is arranged to enable manual interaction between a player and the gaming system and for this purpose includes the input/output components required for the player to enter instructions and play the game.

Components of the player interface may vary from embodiment to embodiment but will typically include a credit mechanism 52 to enable a player to input credits and receive payouts, one or more displays 54, a game play mechanism 56 that enables a player to input game play instructions (e.g. to place bets), and one or more speakers 58.

The game controller 60 is in data communication with the player interface and typically includes a processor 62 that processes the game play instructions in accordance with game play rules and outputs game play outcomes to the display. Typically, the game play instructions are stored as program code in a memory 64 but can also be hardwired. Herein the term "processor" is used to refer generically to any device that can process game play instructions in accordance with game play rules and may include: a microprocessor, microcontroller, programmable logic device or other computational device, a general purpose computer (e.g. a PC) or a server.

Figure 2:
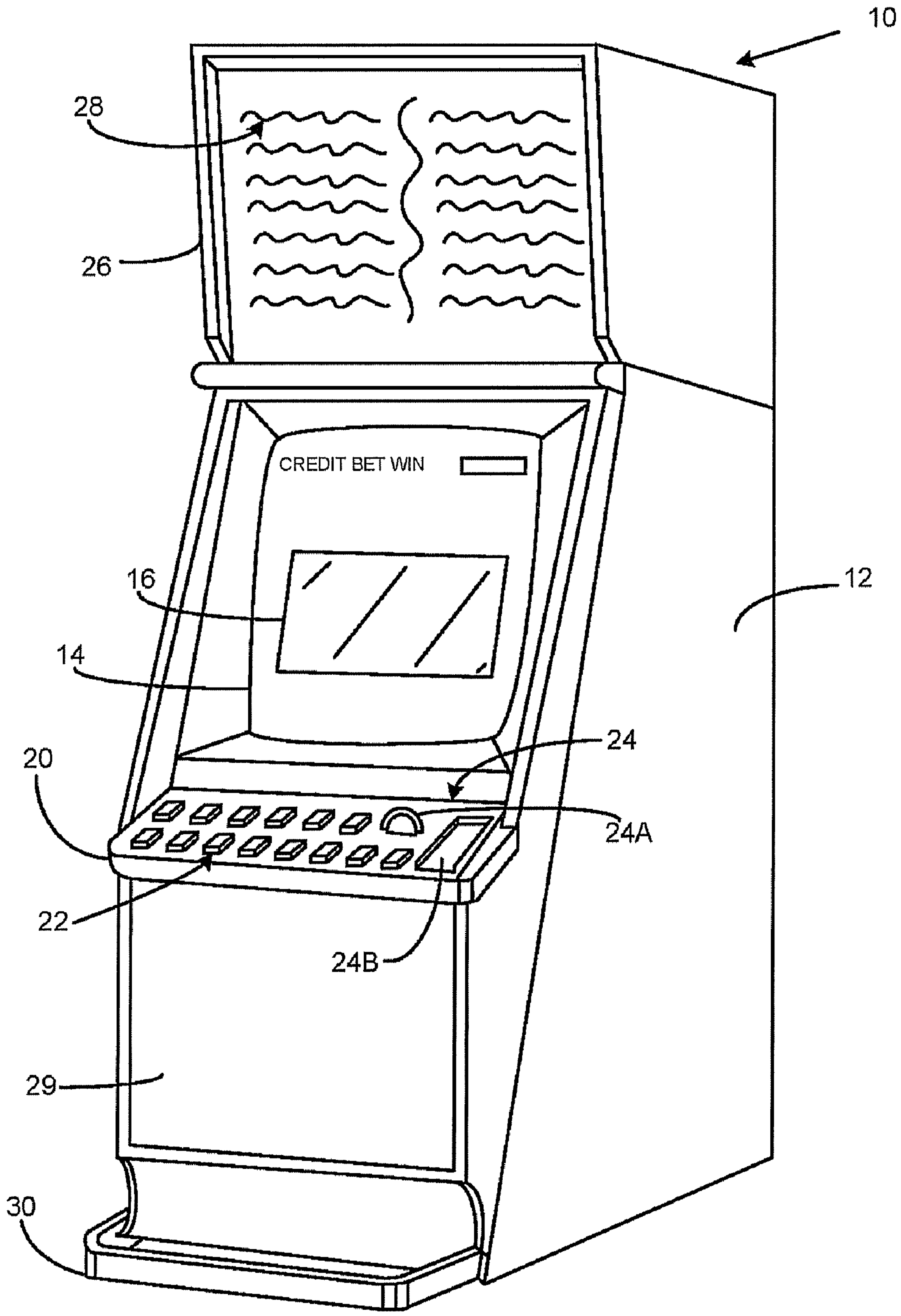
FIG. 2 is a perspective view of a stand alone gaming machine.

A gaming system in the form of a stand alone gaming machine 10 is illustrated in FIG. 2. The gaming machine 10 includes a console 12 having a display 14 on which are displayed representations of a game 16 that can be played by a player. A mid-trim 20 of the gaming machine 10 houses a bank of buttons 22 for enabling a player to interact with the gaming machine, in particular during game play. The mid-trim 20 also houses a credit input mechanism 24 which in this example includes a coin input chute 24A and a bill collector 24B. Other credit input mechanisms may also be employed, for example, a card reader for reading a smart card, debit card or credit card. A player marketing module (not shown) having a reading device may also be provided for the purpose of reading a player tracking device, for example as part of a loyalty program. The player tracking device may be in the form of a card, flash drive or any other portable storage medium capable of being read by the reading device.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 10.

The display 14 shown in FIG. 2 is in the form of a video display unit, particularly a cathode ray tube screen device. Alternatively, the display 14 may be a liquid crystal display, plasma screen, any other suitable video display unit, or the visible portion of an electromechanical device. The top box 26 may also include a display, for example a video display unit, which may be of the same type as the display 14, or of a different type.

Figure 3:
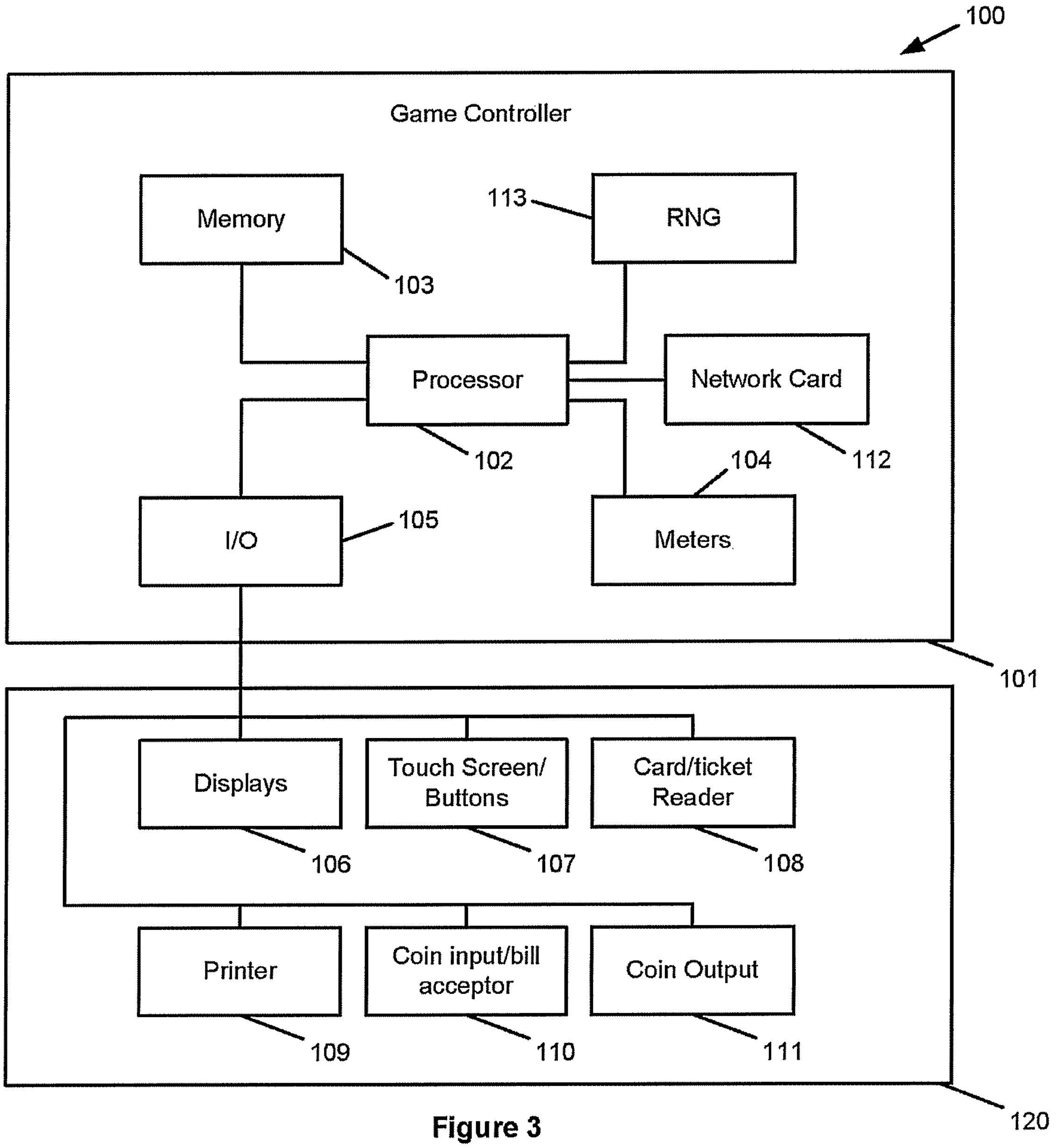
FIG. 3 is a block diagram of the functional components of a gaming machine.

FIG. 3 shows a block diagram of operative components of a typical gaming machine which may be the same as or different to the gaming machine of FIG. 2.

The gaming machine 100 includes a game controller 101 having a processor 102. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 comprise one or more displays 106, a touch screen and/or buttons 107, a card and/or ticket reader 108, a printer 109, a bill acceptor and/or coin input mechanism 110 and a coin output mechanism 111. Additional hardware may be included as part of the gaming machine 100, or hardware may be omitted as required for the specific implementation.

In addition, the gaming machine 100 may include a communications interface, for example a network card 112. The network card may, for example, send status information, accounting information or other information to a central controller, server or database and receive data or commands from the central controller, server or database.

Figure 4:
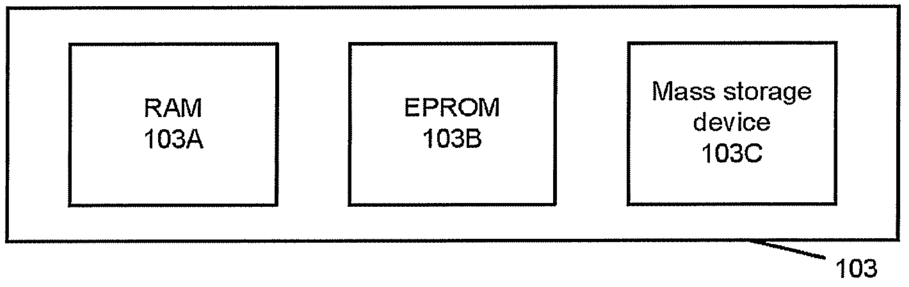
FIG. 4 is a schematic diagram of the functional components of a memory.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106,107,108,109,110,111 to be provided remotely from the game controller 101.

Figure 5:
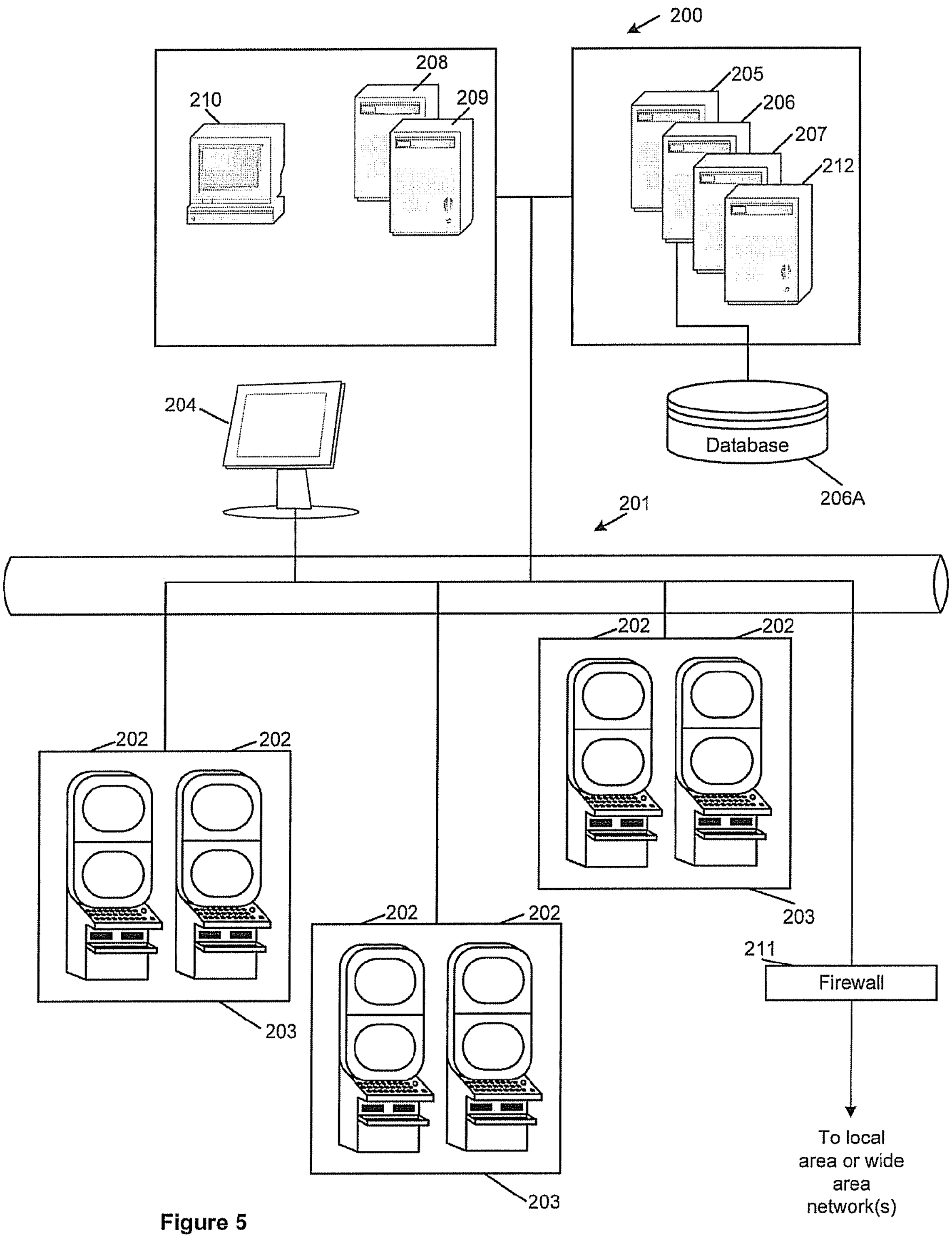
FIG. 5 is a schematic diagram of a network gaming system.

FIG. 5 shows a gaming system 200 in accordance with an alternative embodiment. The gaming system 200 includes a network 201, which for example may be an Ethernet network. Gaming machines 202, shown arranged in three banks 203 of two gaming machines 202 in FIG. 5, are connected to the network 201. The gaming machines 202 provide a player operable interface and may be the same as the gaming machines 10,100 shown in FIGS. 2 and 3, or may have simplified functionality depending on the requirements for implementing game play. While banks 203 of two gaming machines are illustrated in FIG. 5, banks of one, three or more gaming machines are also envisaged.

One or more displays 204 may also be connected to the network 201. For example, the displays 204 may be associated with one or more banks 203 of gaming machines. The displays 204 may be used to display representations associated with game play on the gaming machines 202, and/or used to display other representations, for example promotional or informational material.

In a thick client embodiment, game server 205 implements part of the game played by a player using a gaming machine 202 and the gaming machine 202 implements part of the game. With this embodiment, as both the game server and the gaming device implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to perform accounting functions for the Jackpot game. A loyalty program server 212 may also be provided.

In a thin client embodiment, game server 205 implements most or all of the game played by a player using a gaming machine 202 and the gaming machine 202 essentially provides only the player interface. With this embodiment, the game server 205 provides the game controller. The gaming machine will receive player instructions, pass these to the game server which will process them and return game play outcomes to the gaming machine for display. In a thin client embodiment, the gaming machines could be computer terminals, e.g. PCs running software that provides a player interface operable using standard computer input and output components.

Servers are also typically provided to assist in the administration of the gaming network 200, including for example a gaming floor management server 208, and a licensing server 209 to monitor the use of licenses relating to particular games. An administrator terminal 210 is provided to allow an administrator to run the network 201 and the devices connected to the network.

The gaming system 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of game servers could be provided to run different games or a single game server may run a plurality of different games as required by the terminals. Persons skilled in the art will also appreciate that the method of the embodiment could be embodied in program code. The program code could be supplied in a number of ways, for example on a computer readable medium, such as a disc or a memory (for example, that could replace part of memory 103) or as a data signal (for example, by downloading it from a server).

Further Description of Gaming System

In this embodiment a symbol pattern or "winning grid" is provided as an additional win entitlement to a base player win entitlement such that it can be awarded as an additional bonus. In alternative embodiments, the symbol pattern may be the sole win entitlement and/or there may be plural symbol patterns. The player may be required to make an additional wager to have access to the winning grid or it may be available for a normal bet. Alternative eligibility requirements may also be applied, for example, the player may access the grid if they achieve a specific turnover, a specific combination or if a system connected to the gaming machine chooses to make an award to the player.

Figure 6:
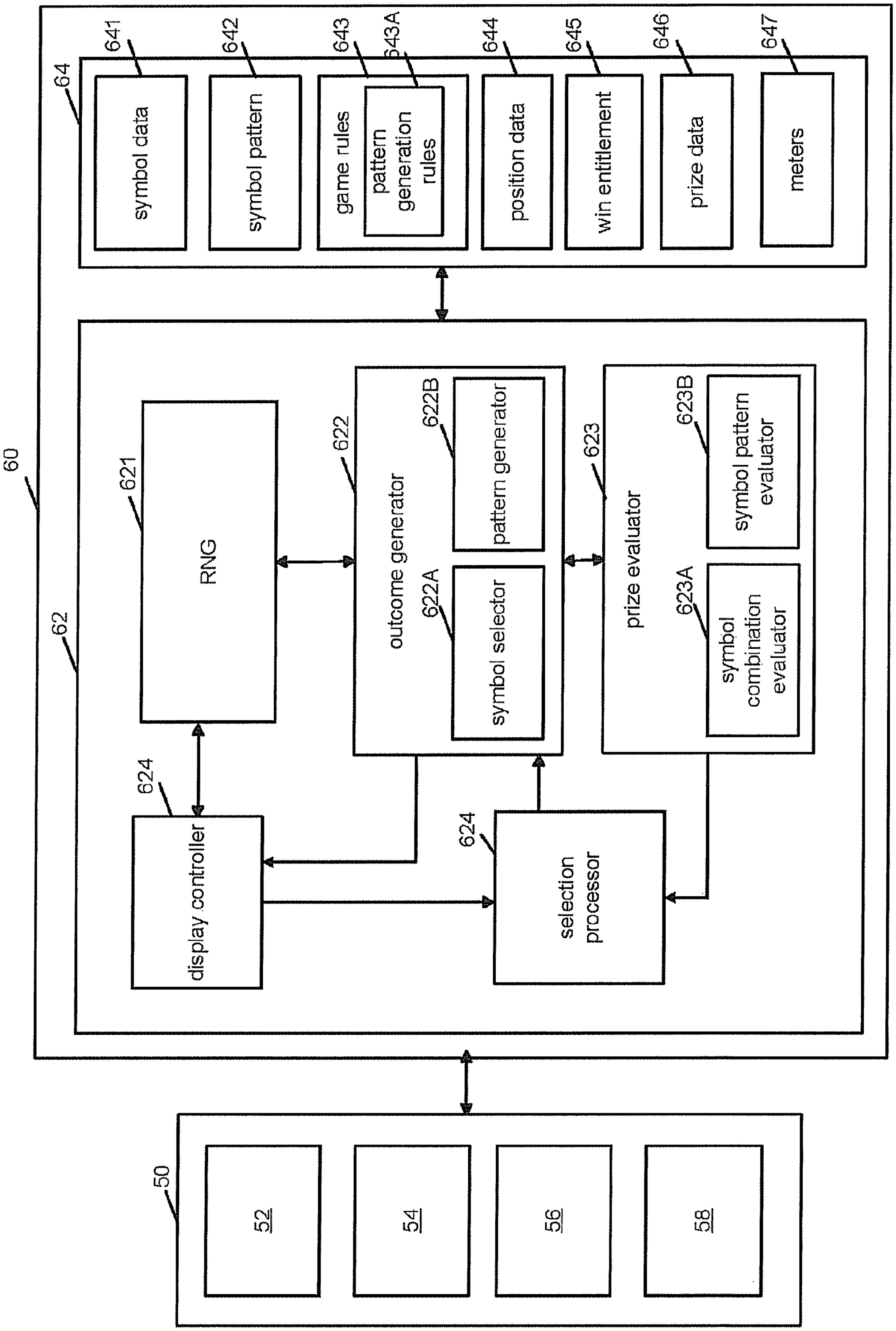
FIG. 6 is a further block diagram of a gaming system.

Referring to FIG. 6, the symbol pattern is generated by the symbol pattern generator 622B selecting a subset of the symbol positions which will be displayed as filled with symbols when a game outcome is generated. For example, if the winning grid is implemented in relation to a spinning reel type game, portions of each reel will be displayed at a plurality of symbol positions on the display 54, for example, at three symbol positions for each of five reels. To this end, the game controller 60 has a symbol pattern generator 622B arranged to generate a symbol pattern by selecting display positions from position data 644 in accordance with pattern generator rules 643A. Typically, the symbol pattern that is generated is stored 642 and is displayed on display 54 to the player under control of display controller 624, for example, above the normal display of the reels, on a secondary display, on the display of an associated player tracking module, or as an underlay or overlay of the existing reels so that a player can anticipate and verify the win.

In an alternative embodiment, the symbol pattern may be selected by the player, for example, in an embodiment, where a touch screen is associated with display 54, the player may be asked to select a pattern by touching a designated number of positions in the grid. The selected positions are stored as symbol pattern data 642 by the game controller 60.

The player's eligibility for the symbol pattern may be obtained in a number of different ways depending on the embodiment, for example, the player may purchase the entitlement or be awarded the grid during a free game sequence. The number of positions to be chosen could be fixed or be variable. The duration of the chose grid could be one game or a series of games or until such time that the player changes the selection or reduces a purchasing bet.

In embodiments, where the number of positions can be varied, the number of positions available could be linked to the game play history on the gaming machine or the player's status. For example, a loyalty point status based on data obtained from loyalty server 212 or from a loyalty card inserted in a player tracking module connected to the gaming machine, so that players with higher loyalty status obtain "better" symbol pattern. What makes a symbol pattern "better" will depend on the pay table and could be more or less symbol positions depending on the embodiment.

In embodiments where the symbol pattern is an additional win entitlement, the generation of the pattern is typically constrained by rules 643A so that the pattern is different to any of the win lines. This can be achieved in a number of ways including constraining the generation of the pattern such that display positions cannot be selected from all reels or that if display positions are selected for all reels, at least one additional display position is selected for one of the reels. Alternatively, the game designer may chose a selection process that is unlikely to produce a symbol pattern that is the same as a win line. Other constraints may also be applied for example to ensure that the symbol pattern is formed of contiguous display positions or has a minimum or maximum number of display positions.

Generation rules 643A also specify when the symbol pattern generator 622B should generate a new symbol pattern. For example, each game round (spin in a spinning reel embodiment) after a win (or a particular win), or after a defined idle period so that a new pattern is generated for a new player.

Persons skilled in the art will appreciate that a player's base win entitlement will vary from game to game and may or may not be dependent on player selections. In most spinning reel games, it is typical for the player's entitlement to be affected by the amount they wager and selections they make (i.e. the nature of the wager). For example, a player's win entitlement may be based on how many lines they will play in each game—i.e. a minimum of one line up to the maximum number of lines allowed by the game (noting that not all permutations of win lines may be available for selection. Such win lines are typically formed by a combination of displayed symbol positions, one from each reel, the symbol positions being located relative to one another such that they form a line.

In many games, the player's win entitlement is not strictly limited to the lines they have selected, for example, "scatter" pays are awarded independently of a players selection of pay lines and are an inherent part of the win entitlement.

Persons, skilled in the art, will appreciate that in other embodiments, the player may obtain a win entitlement by selecting a number of reels to play. Such games are marketed under the trade name "Reel Power" by Aristocrat Leisure Industries Pty Ltd. The selection of the reel means that each symbol of the reel can be substituted for a symbol at one or more designated display positions. In other words, all symbol positions of a selected reel can be used to form symbol combinations with designated, displayed symbol positions of other reels.

In other embodiments a base player win entitlement may be affected by purchasing access to particular pay tables—e.g. a first bet amount entitles the player to wins including cherries and a second amount entitles them to wins including plums. The win entitlement is not always purchased—e.g. a series of free games may be awarded.

After the player's win entitlement has been specified and a pattern has been generated, the outcome generator 622 generates a game outcome by employing a symbol selector 622A to select a plurality of symbols to be displayed in the display position. In the case of a spinning reel type embodiment, this is achieved by selecting stopping positions for each of a plurality of virtual reels, the virtual reels having a set of symbols in a defined sequence such that the stop position defines the symbols which will appear on the display 54. For example, the symbol selector 622A may use random number generator (RNG) 621 to select stop positions for five separate reels each having three symbols displayed on the display such that 15 displays positions are on the screen arranged in five columns.

In embodiments where a symbol pattern is generated for each game outcome, the symbol pattern can be generated concurrently by the pattern generator 622B using RNG 621 and displayed either before the reels are spun, as the reels are being spun, or just after the reels are spun.

After the symbols have been selected by selector 622A, the prize evaluator 623 determines whether the player has achieved any wins based on their win entitlements 645 and the prize data 646. To this end, the prize evaluator 623 has a symbol combination evaluator 623A for evaluating the players base entitlement (i.e. by determining whether any of the symbol combinations correspond to prizes) as well as a symbol pattern evaluator 623B which determines the extent to which designated winning symbols of the selected symbols correspond to the symbol pattern on the display.

Depending on the embodiment, the winning symbols may be any symbols that are found in the prize table or a subset of symbols be restricted solely to evaluation of the symbol pattern—i.e. there may be symbols which result in wins in normal symbol combinations in accordance with a player's base win entitlement but cannot result in wins for a symbol pattern.

A number of different rules can be implemented in order to determine the extent to which the symbols pattern corresponds to the winning symbols. For example, a prize may be awarded only for exact match where the symbol pattern is filled with winning symbols and there are no left over winning symbols of the same type. In some embodiments prizes may be awarded for near misses, for example where there is a small number of leftover winning symbols or the symbol pattern is nearly filled by winning symbols. Other variations will be apparent to persons skilled in the art. Once the prizes have been determined the prize evaluator 623 updates the meters 647 as well as displaying any wins on display 54 under control of display controller 624.

Figure 7:
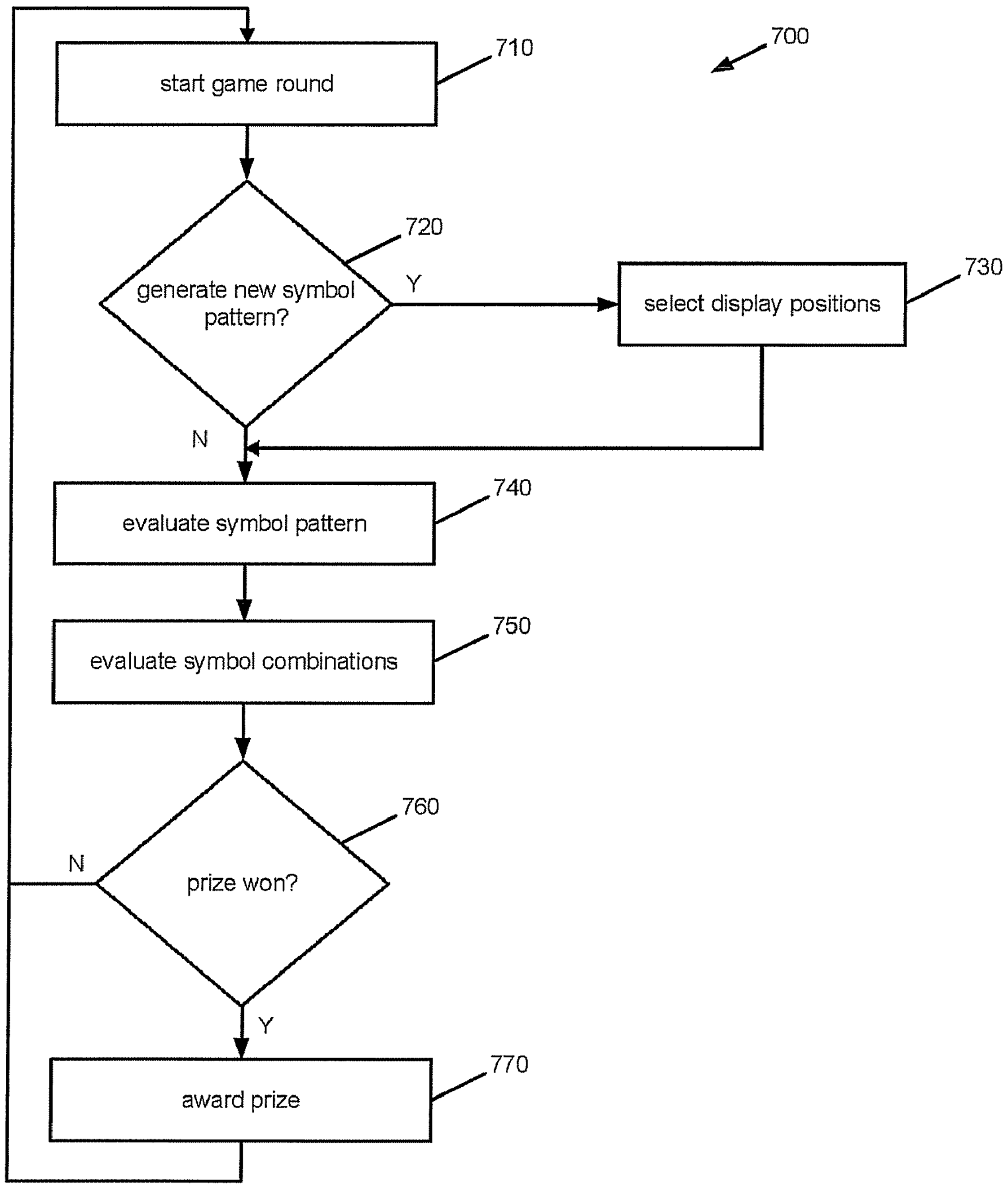
FIG. 7 is a flow chart of an embodiment.

The method of the embodiment 700 is summarised in FIG. 7. A game round is started 710 and is determined whether it is necessary to generate a new symbol pattern 720. If it is necessary to generate a new symbol pattern, symbol positions are selected 730 and displayed on the display 735. Irrespective of whether the new symbol pattern is generated or not, the method involves evaluating the symbol pattern against the displayed symbols 740 as well as evaluating symbol combinations 750 before determining whether any prizes are won 760 and the prizes either awarded 770 or the method proceeds to the start of another game round.

EXAMPLES

Referring to FIGS. 8A to 8F there are shown a number of examples where the winning grid is applied. In these examples, the winning grid is triggered in response to a particular symbol combination occurring in the base game.

A winning grid scorecard applies which is as follows:

all winning symbols match a square of the winning grid with no winning symbols missed by the symbol pattern: 500 credits×initial wager;

all squares matched with winning symbols but not an exact match: 300 credits×initial wager;

one square in the grid is missed: 100 credits×initial wager; and two squares in the grid are missed: 10 credits×initial wager.

Figure 8A:
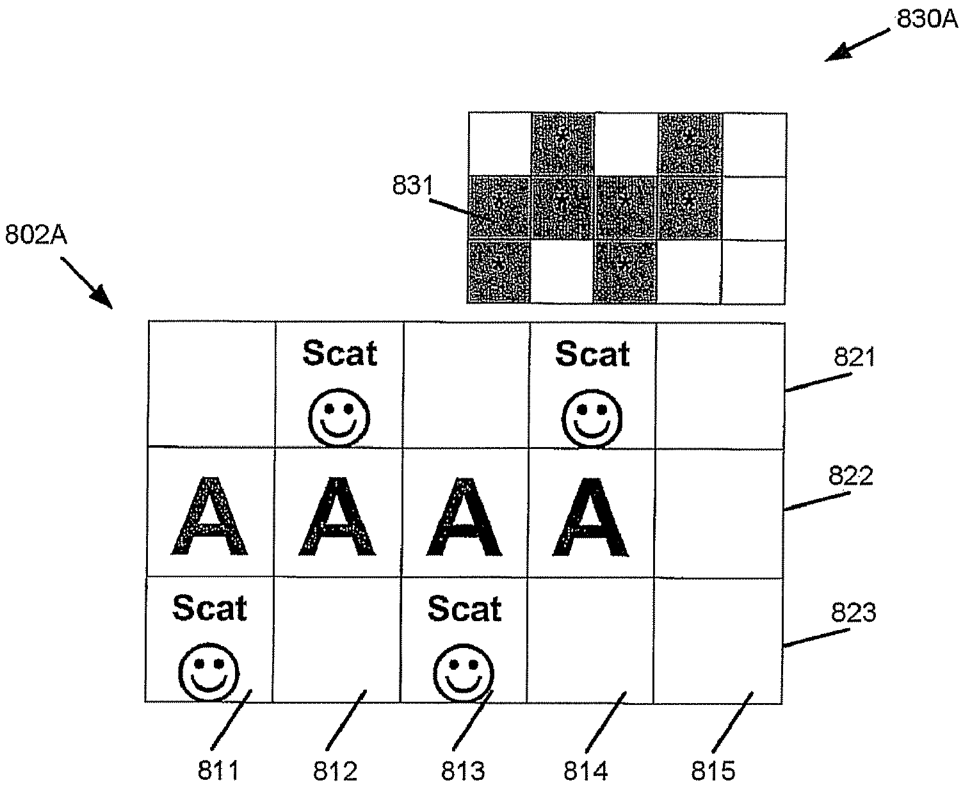
FIGS. 8A to 8F show exemplary winning grids.

Referring to FIG. 8A there is shown an exemplary display which has a normal display 802A which corresponds to three symbols from each five reels 811 to 815 arranged on three rows 821 to 823. Above the display of the stop positions the reel there is shown a smaller version of the display positions which shows the winning grid with the shaded symbols defining a symbol pattern 831. An asterisk or asterisks at positions of the winning grid display 830A show the location of winning symbols in the main display 802A. In this example it will be seen that there is an exact match as there are winning symbols at each position of the symbol pattern 831. In this case winning symbols are aces and scatter symbols. That is there are four aces and four scatter symbols at the relevant positions; this results in a bonus win of 500 credits.

Figure 8B:
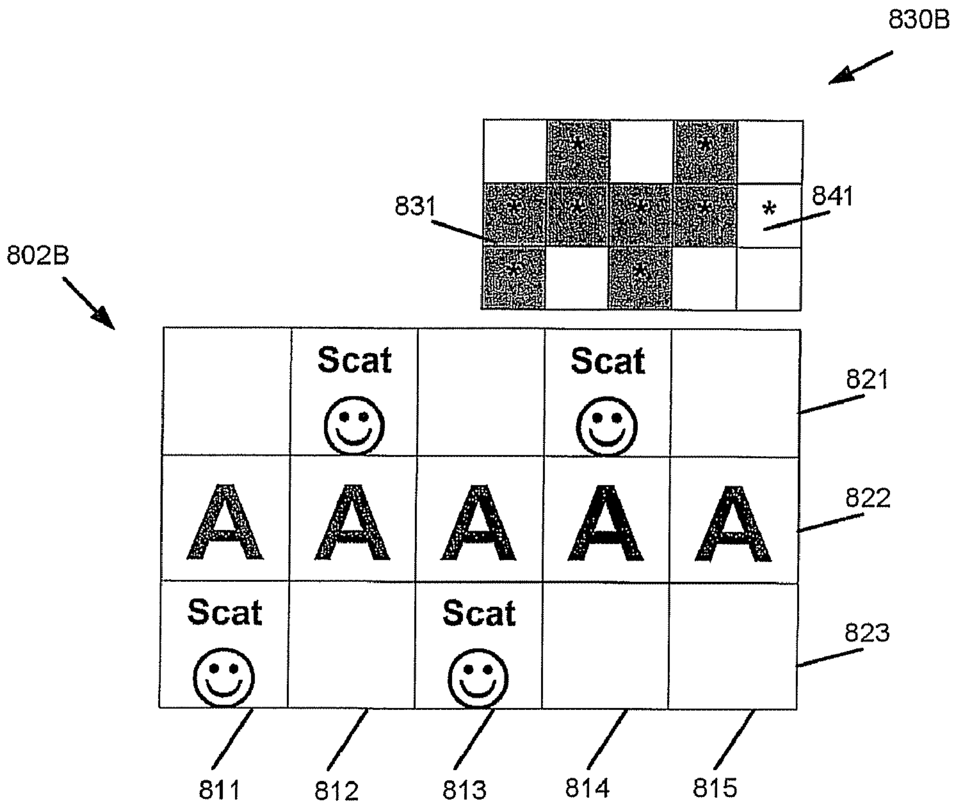

FIG. 8B shows an alternative example with a symbol pattern 831 is the same as in FIG. 8A but there is a an additional ace symbol left over as indicated by asterisk 841 on winning grid display 830B. Accordingly this is not an exact match as there is one symbol left over. An award of 300 credits is made.

Figure 8C:
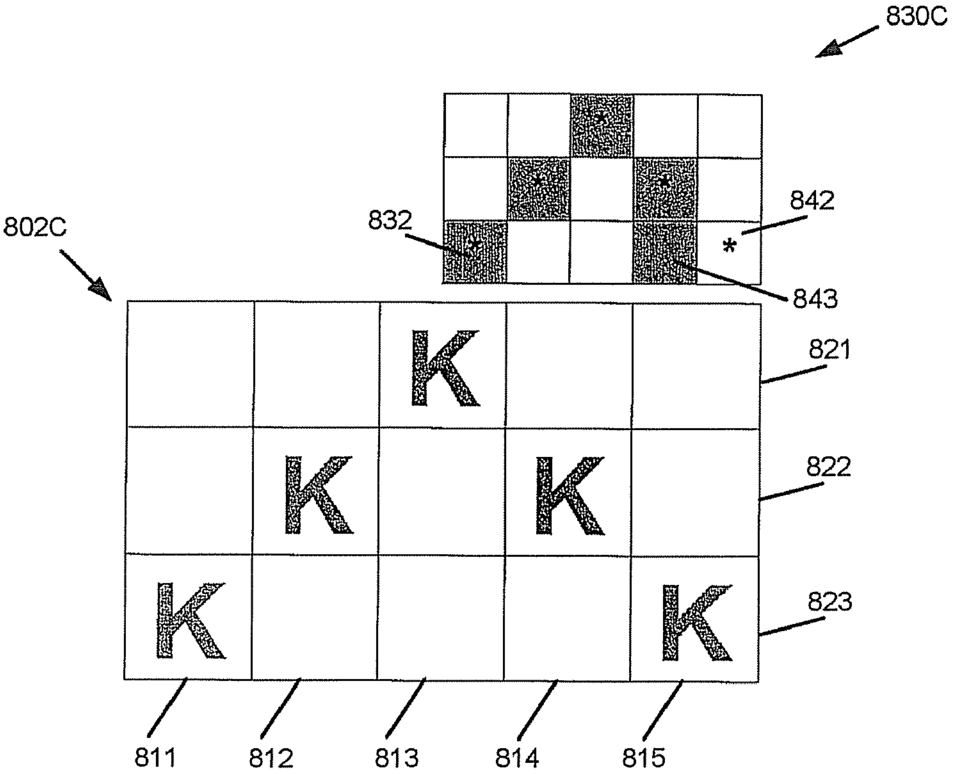

FIG. 8C shows an alternative arrangement with a different symbol pattern 832. In this symbol pattern there is one square (or part of the symbol pattern) that is missed 843 and a leftover symbol 842. In this case a bonus win of 100 credits is awarded because one square in the winning grid is missed in the arrangement shown 830C.

Figure 8D:
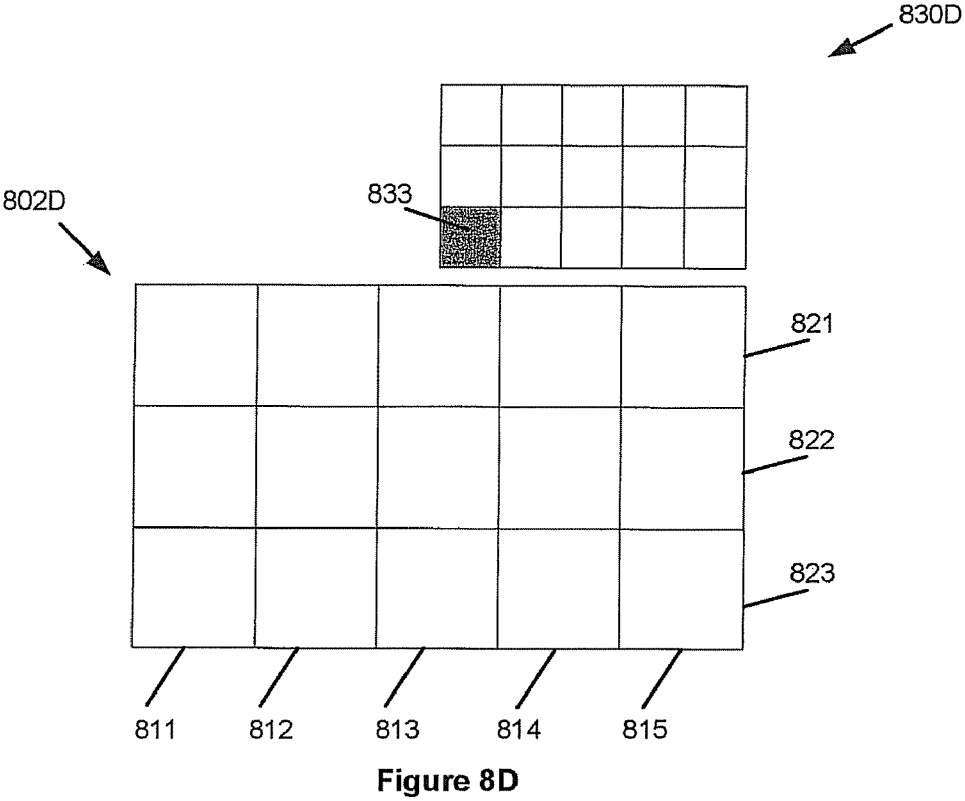

FIG. 8D shows that winning grids consisting of small numbers of display positions may be provided. Such symbol patterns can be considered to be lucky as a player can potentially win a prize even if they have no matching symbols. Accordingly in the arrangement shown in FIG. 8D, the winning grid 833 shown in grid display 830D has only one symbol position. Accordingly, even though the main display 802D has no winning symbols, the player wins because this is a situation where only one square in the grid is missed. Accordingly, the player wins a prize of 100 credits.

Figure 8E:
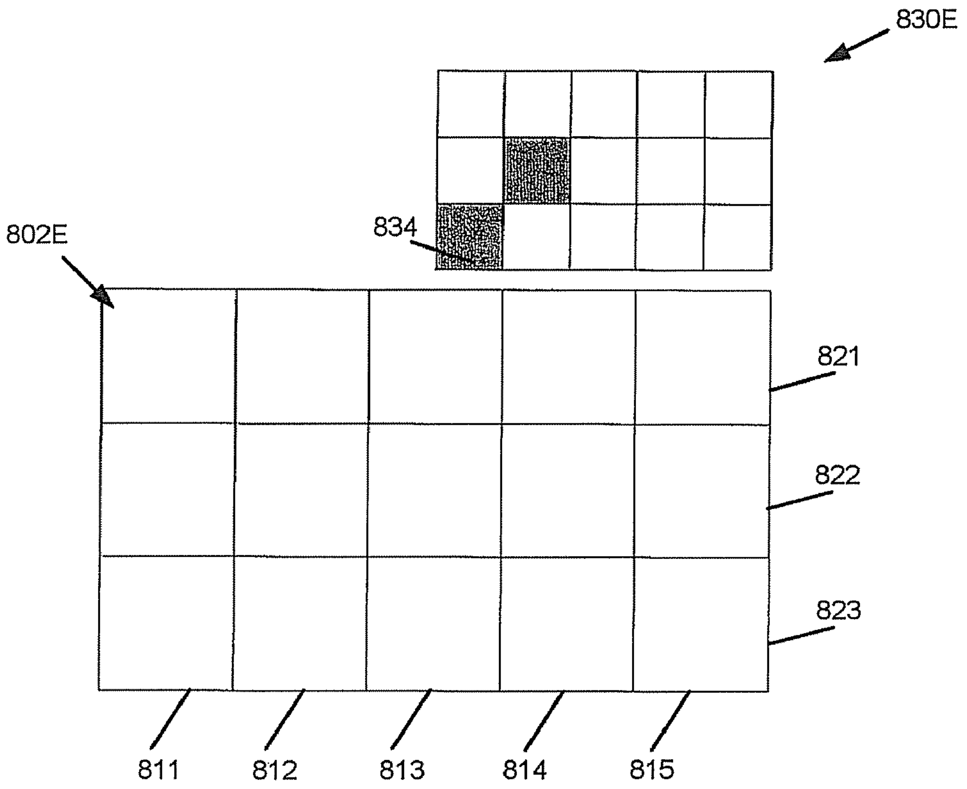

A similar situation is shown in the displays 830E and 802E of FIG. 8E where the winning grid 834 consists of two display positions both of which are missed and the player wins a bonus of 10 credits multiplied by credits bets.

Figure 8F:
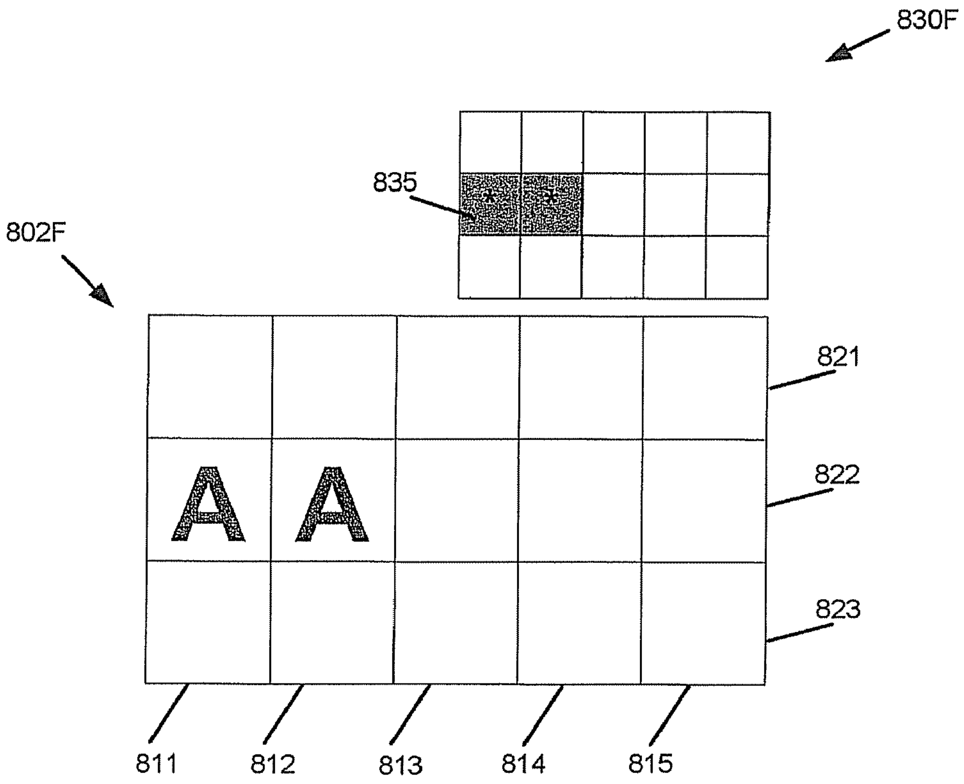

The FIG. 8F shows a similar situation with another small winning grid 835 but this time the grid 835 is filled by the two aces which are winning symbols. Without the winning grid feature, this winning combination would normally only achieve a small prize. With the feature, a bonus win of 500 credits multiplied by credits bet is made for an exact match based on the two aces.

It will be understood to persons skilled in the art of the invention that many modifications may be made without departing from the spirit and scope of the invention. In particular, that various features described above may be combined to form further embodiments.

It is to be understood that, if any prior art publication is referred to herein, such reference does not constitute an admission that the publication forms a part of the common general knowledge in the art in any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A method of gaming using a display and a game controller, comprising:

generating a game outcome by selecting symbols via the game controller for a plurality of symbol positions arranged in a plurality of columns, at least some of the selected symbols being displayed to a player;

evaluating the game outcome via the game controller in respect of a predefined base win entitlement that is defined by one or more combinations of symbol positions, each combination formed from a symbol position of each column;

generating, in accordance with a generation rule, a further win entitlement by selecting via the game controller a new symbol pattern to be evaluated in respect of the game outcome, the new symbol pattern consisting of a subset of displayed symbol positions, the generation rule at least specifying when a new symbol pattern is selected;

displaying on the display via the game controller a representation of the new symbol pattern in a position that is proximal to the plurality of columns so as to inform the player of the new symbol pattern that has been selected; and evaluating the further win entitlement by determining via the controller the extent to which the subset of displayed symbol positions corresponds to one or more designated winning symbols.

2. A method as claimed in claim 1, wherein the method comprises evaluating the game outcome in respect of a base win entitlement defined by one or more combinations of symbol positions, each combination formed from a symbol position of each column.

3. A method as claimed in claim 1, wherein the number of symbol positions of the subset is randomly determined.

4. A method as claimed in claim 1, wherein the positions of the symbol positions of the subset are randomly determined.

5. A method as claimed in claim 3, wherein at least one random determination is limited by one or more constraints.

6. A method as claimed in claim 5, wherein a constraint is a maximum number of symbol positions.

7. A method as claimed in claim 5, wherein a constraint is a minimum number of symbol positions.

8. A method as claimed in claim 5, wherein a constraint is that the symbol positions must be contiguous.

9. A method as claimed in claim 1, wherein a new win entitlement is generated for each game round such that a new symbol pattern is selected for each game round.

10. A method as claimed in claim 1, wherein a new win entitlement is generated after a defined period such that a new symbol pattern is selected for each new player.

11. A method as claimed in claim 1, wherein a new win entitlement is generated subsequent to a winning outcome occurring.

12. A method as claimed in claim 1, wherein determining the extent to which the subset of displayed symbol positions corresponds to one or more designated winning symbols includes determining whether the number of winning symbols in the symbol pattern is within a designated number of symbols required to fill all the symbol positions.

13. A method as claimed in claim 2, wherein the base win entitlement is defined by a player selection of one or more play lines, each play line consisting of a combination of displayed symbol positions.

14. A method as claimed in claim 2, wherein the base win entitlement is defined by a player selection of reels, each symbol position of a selected reel forming a symbol combination with designated displayed symbol positions of non-selected reels.

15. A method as claimed in claim 2, wherein the step of selecting a symbol pattern is performed by a player.

16. A method as claimed in claim 1, wherein the step of selecting a symbol pattern is performed by a game controller.

17. A game controller for a gaming system having a display, the game controller arranged to:

generate a game outcome by selecting symbols for a plurality of symbol positions arranged in a plurality of columns, at least some of the selected symbols being for display to a player on a display;

evaluate the game outcome in respect of a predefined base win entitlement that is defined by one or more combinations of symbol positions, each combination formed from a symbol position of each column;

generate, in accordance with a generation rule, a further win entitlement by selecting a new symbol pattern to be evaluated in respect of the game outcome, the new symbol pattern consisting of a subset of displayed symbol positions, the generation rule at least specifying when a new symbol pattern is selected;

display a representation of the new symbol pattern in a position that is proximal to the plurality of columns so as to inform the player of the new symbol pattern that has been selected; and evaluate a further win entitlement generated by obtaining a symbol pattern to be evaluated in respect of the game outcome, the symbol pattern consisting of a subset of displayed symbol positions, the evaluation performed by determining the extent to which the subset of displayed symbol positions corresponds to one or more designated winning symbols.

18. A game controller as claimed in claim 17, comprising an outcome generator arranged to generate the game outcome.

19. A game controller as claimed in claim 17 comprising a symbol pattern generator arranged to generate the symbol pattern.

20. A game controller as claimed in claim 17, arranged to determine the symbol pattern based on one or more selections made by a player employing a game play mechanism in data communication with the game controller.

21. A game controller as claimed in claim 17, arranged to evaluate the game outcome in respect of a base win entitlement defined by one or more combinations of symbol positions, each combination formed from a symbol position of each column.

22. A game controller as claimed in claim 17, arranged to randomly determine the number of symbol positions of the subset.

23. A game controller as claimed in claim 17, arranged to randomly determine the positions of the symbol positions of the subset.

24. A game controller as claimed in claim 22, wherein at least one random determination is limited by one or more constraints.

25. A game controller as claimed in claim 24, wherein a constraint is a maximum number of symbol positions.

26. A game controller as claimed in claim 24, wherein a constraint is a minimum number of symbol positions.

27. A game controller as claimed in claim 24, wherein a constraint is that the symbol positions must be contiguous.

28. A game controller as claimed in claim 2, arranged to generate a new win entitlement for each game round such that a new symbol pattern is selected for each game round.

29. A game controller as claimed in claim 2, arranged to generate a new win entitlement after a defined period such that a new symbol pattern is selected for each new player.

30. A game controller as claimed in claim 20, arranged to generate a new win entitlement subsequent to a winning outcome occurring.

31. A game controller as claimed in claim 17, arranged to determine the extent to which the subset of displayed symbol positions corresponds to one or more designated winning symbols at least partly by determining whether the number of winning symbols in the symbol pattern is within a designated number of symbols required to fill all the symbol positions.

32. A game controller as claimed in claim 17, arranged to select the symbol pattern.

33. A gaming system comprising:

a display; and a game controller arranged to:

generate a game outcome by selecting symbols for a plurality of symbol positions arranged in a plurality of columns, at least some of the selected symbols being for display to a player on a display;

evaluate the game outcome in respect of a predefined base win entitlement that is defined by one or more combinations of symbol positions, each combination formed from a symbol position of each column;

generate, in accordance with a generation rule, a further win entitlement by selecting a new symbol pattern to be evaluated in respect of the game outcome, the new symbol pattern consisting of a subset of displayed symbol positions, the generation rule at least specifying when a new symbol pattern is selected;

display a representation of the new symbol pattern in a position that is proximal to the plurality of columns so as to inform the player of the new symbol pattern that has been selected; and evaluate a further win entitlement generated by obtaining a symbol pattern to be evaluated in respect of the game outcome, the symbol pattern consisting of a subset of displayed symbol positions, the evaluation performed by determining the extent to which the subset of displayed symbol positions corresponds to one or more designated winning symbols.

34. A gaming system as claimed in claim 33, wherein the game controller comprises an outcome generator arranged to generate the game outcome.

35. A gaming system as claimed in claim 33 wherein the game controller comprises a symbol pattern generator arranged to generate the symbol pattern.

36. A gaming system as claimed in claim 33, wherein the display is part of a player interface in data communication with the game controller, the player interface further comprising a game play mechanism operable by a player to place a wager from which a base win entitlement is established, the base win entitlement being defined by one or more combinations of symbol positions, each combination formed from a symbol position of each column.

37. A gaming system as claimed in claim 36 wherein the game play mechanism is operable to select the symbol pattern.

38. A gaming system as claimed in claim 33, wherein the game controller is arranged to randomly determine the number of symbol positions of the subset.

39. A gaming system as claimed in claim 33, wherein the game controller is arranged to randomly determine the positions of the symbol positions of the subset.

40. A gaming system as claimed in claim 38, wherein at least one random determination is limited by one or more constraints.

41. A gaming system as claimed in claim 40, wherein at least one constraint is selected from the group comprising a maximum number of symbol positions; a minimum number of symbol positions; and a requirement that the symbol positions must be contiguous.

42. A gaming system as claimed in claim 33, wherein the game controller is arranged to generate a new win entitlement for each game round such that a new symbol pattern is selected for each game round.

43. A gaming system as claimed in claim 33, wherein the game controller is arranged to generate a new win entitlement after a defined period such that a new symbol pattern is selected for each new player.

44. A gaming system as claimed in claim 33, wherein the game controller is arranged to generate a new win entitlement subsequent to a winning outcome occurring.

45. A gaming system as claimed in claim 33, wherein the game controller is arranged to determine the extent to which the subset of displayed symbol positions corresponds to one or more designated winning symbols at least partly by determining whether the number of winning symbols in the symbol pattern is within a designated number of symbols required to fill all the symbol positions.

46. A gaming system as claimed in claim 33, wherein the game controller is arranged to select the symbol pattern.

47. A method as claimed in claim 1 wherein said generating a further win entitlement comprises selecting a new symbol pattern after each game round.

48. A method as claimed in claim 1 wherein said generating a further win entitlement comprises selecting a new symbol pattern after a win.

49. A method as claimed in claim 1 wherein said generating a further win entitlement comprises selecting a new symbol pattern after a defined idle period.

50. A method as claimed in claim 1 wherein said generating a further win entitlement comprises selecting a new symbol pattern for a new player.

51. A game controller as claimed in claim 17 being further arranged to generate a further win entitlement by selecting a new symbol pattern after each game round.

52. A game controller as claimed in claim 17 being further arranged to generate a further win entitlement by selecting a new symbol pattern after a win.

53. A game controller as claimed in claim 17 being further arranged to generate a further win entitlement by selecting a new symbol pattern after a defined idle period.

54. A game controller as claimed in claim 17 being further arranged to generate a further win entitlement by selecting a new symbol pattern for a new player.

* * * * *